United States Patent
Perdicaro et al.

(10) Patent No.: US 10,706,338 B2
(45) Date of Patent: Jul. 7, 2020

(54) MINIMIZING VISUAL VARIATIONS IN MULTI-LANE PRINT OUTPUTS

(71) Applicant: Hewlett-Packard Development Company, L.P., Houston, TX (US)

(72) Inventors: Frank E Perdicaro, Corvallis, OR (US); Matthew Alan MacClary, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/096,605

(22) PCT Filed: Jul. 18, 2016

(86) PCT No.: PCT/US2016/042720
§ 371 (c)(1),
(2) Date: Oct. 25, 2018

(87) PCT Pub. No.: WO2018/017036
PCT Pub. Date: Jan. 25, 2018

(65) Prior Publication Data
US 2019/0138862 A1    May 9, 2019

(51) Int. Cl.
| G06K 15/02 | (2006.01) |
| B41J 3/62 | (2006.01) |
| H04N 1/60 | (2006.01) |
| H04N 1/409 | (2006.01) |

(52) U.S. Cl.
CPC .............. *G06K 15/027* (2013.01); *B41J 3/62* (2013.01); *G06K 15/022* (2013.01); *H04N 1/409* (2013.01); *H04N 1/6033* (2013.01)

(58) Field of Classification Search
None
See application file for complete search history.

(56) References Cited

U.S. PATENT DOCUMENTS

| 5,587,728 | A | 12/1996 | Edgar |
| 7,965,414 | B2 | 6/2011 | Wu et al. |
| 7,969,613 | B2 | 6/2011 | Honeck et al. |
| 8,194,281 | B2 | 6/2012 | Toyoda |
| 8,851,601 | B2 | 10/2014 | Zhang et al. |
| 2004/0008371 | A1* | 1/2004 | Keane .................... G06Q 40/00 358/1.15 |
| 2005/0199151 | A1* | 9/2005 | Holten ................ B41F 33/0045 101/484 |
| 2010/0165015 | A1 | 7/2010 | Barkley et al. |
| 2017/0259581 | A1* | 9/2017 | Pfeiffer .................. B41J 2/2132 |

OTHER PUBLICATIONS

Vantram S. et al., "Fully Automated Calibration Procedure to Compensate Print Non-uniformities Incurred in Fixed Print-head Array Structures", Jan. 2014, No. 39.

* cited by examiner

*Primary Examiner* — Thomas D Lee
(74) *Attorney, Agent, or Firm* — Tong, Rea, Bentley & Kim, LLC

(57) ABSTRACT

In an example, an apparatus is described that includes a vision system and an image correction module. The vision system captures an image of a multi-lane print output. The image correction module receives the image of the multi-lane print output from the vision system and calculates a calibration to image data from which the multi-lane output is printed. The calibration minimizes visual variations between the multi-lane print output and a reference image.

14 Claims, 4 Drawing Sheets

MINIMIZING VISUAL VARIATIONS IN MULTI-LANE PRINT OUTPUTS

BACKGROUND

Packaging web presses (or PWPs) are printing devices that are specifically used to print labels, folding cartons, flexible packaging, shrink sleeves, and other types of product packaging.

DETAILED DESCRIPTION

The present disclosure broadly describes an apparatus, method, and non-transitory computer-readable medium for correcting visual variations in multi-lane print outputs. Various types of printing systems are capable of producing multi-lane outputs. The packaging web press (PWP) is one particular example of a printing system that may be used to simultaneously print two or more different images in distinct lanes of its output. For instance, the multi-lane print architecture allows a PWP to print packaging for multiple different products on the same "web" or printing surface. In this case, the web is divided into multiple "lanes" that run the length of the web, where a different image may be printed in each lane. Each lane may further include multiple "ribbons" that run the width of the lane. The image corresponding to a given lane may be repeated across the ribbon (i.e., in the "cross-web" direction), and also along the lane (i.e., in the "down-web" direction).

Although the same digital source image is used when repeating the image across a ribbon and along the lane, this does not necessarily mean that each printed copy of the image will look identical when printed. Hardware variations, such as variations in the PWP's fluid ejection devices (e.g., printheads, printbars, ink pens, or the like), in the die on the fluid ejection devices, and even in the printing surface, can cause undesirable visual variations in the printed output. Wholesale replacement of the hardware, however, can be costly and can result in waste and increased machinery downtime.

Examples of the present disclosure improve the consistency of multi-lane print outputs (e.g., PWP outputs) by calibrating the image data from which the print output is generated in up to three dimensions (e.g., cross-web, down-web, and saturation). Examples of the present disclosure use the print system's vision system to monitor the print output. When a visual variation or inconsistency is detected in the print output, the image processing systems modify the image data (e.g., compressed image files or uncompressed rasterized image files) from which the print output is generated. In further examples, each ribbon in the print output is generated from a unique ribbon image in memory, which is a copy of a master ribbon image (which may come, for instance, from a raster image processor). Each unique copy of the ribbon image has its own compressed image file or uncompressed rasterized image file. This allows a unique correction to be computed and applied to each ribbon of the print output, thereby compensating for hardware variations that may affect different areas of the print output in different ways (e.g., pen-to-pen or die-to-die variations, printing surface irregularities, etc.).

Figure 1:
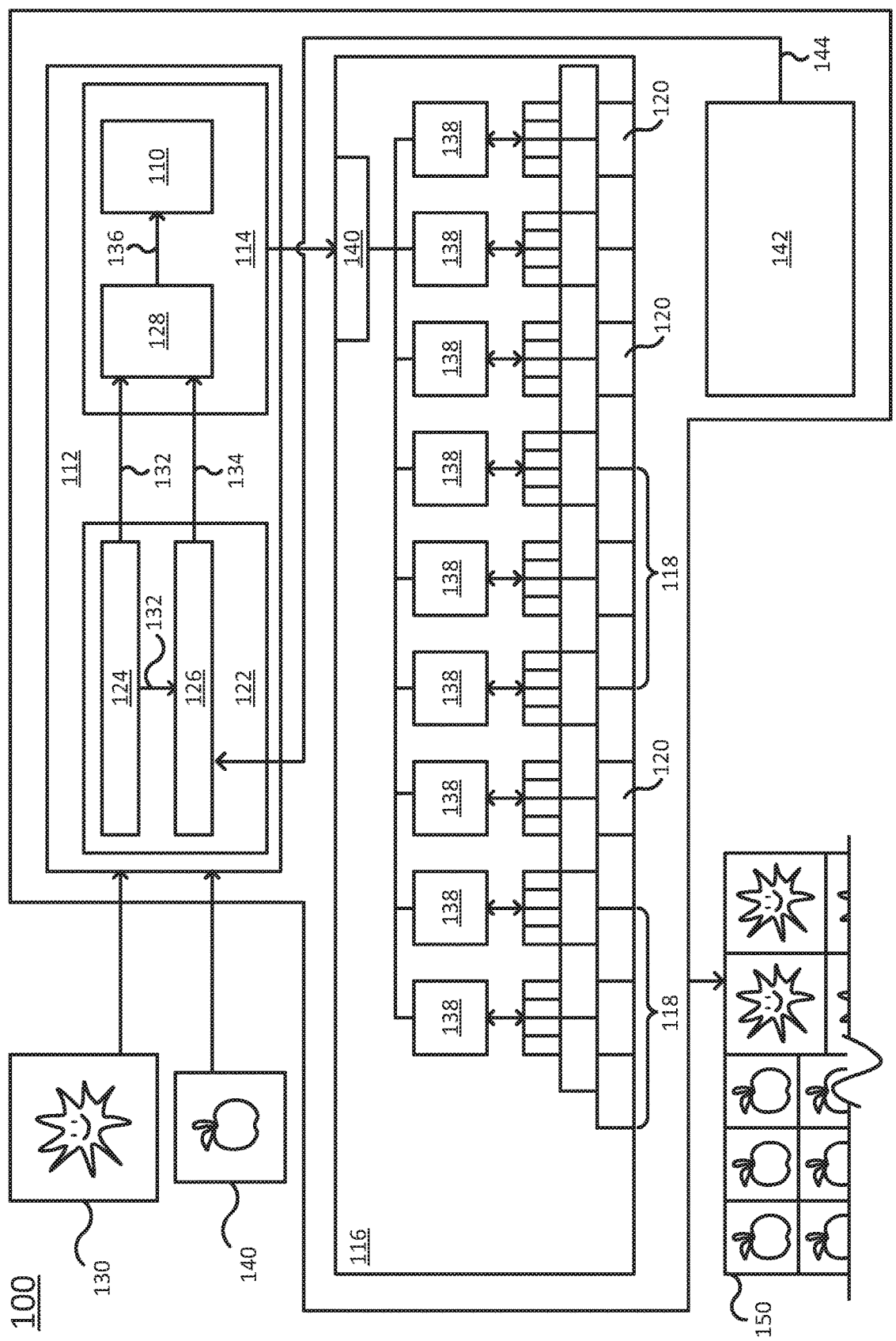
FIG. 1 illustrates an example system of the present disclosure.

FIG. 1 illustrates an example system 100 of the present disclosure. In one example, the system 100 is a printing web press (PWP). The system 100 generally includes an image processing system 112, a print engine 116, and a vision system 142. The image processing system 112, print engine 116, and vision system 142 work together to convert original image data 130 and 140 for a plurality of images (e.g., digital images) into a multi-lane print output 150.

In one example, the image processing system 112 further comprises a raster image processor (RIP) 122 and a print engine controller 114. The RIP 122 converts the page description language (PDL) describing the original image data 130 and 140 to rasterized (e.g., pixelated) image data 132. To this end, the RIP 122 includes a color conversion module 124 and an image correction module 126. The color conversion module 124 performs color conversion on the original image data 130 and 140 and may additionally map the colors to generate continuous tone (or "contone") rasterized image data 132. The color conversion module 124 may use one or more page description languages to process the original image data 130 and 140.

The image correction module 126 identifies visual variations in the print output 150, as well as variations between the original image data 130 and 140 and the print output 150. The image correction module 126 may further compute and apply a calibration to the contone rasterized image data 132 in order to minimize the detected visual variations in modified rasterized image data 134. To this end, the image correction module 126 may store one or more reference images corresponding to the original image data 130 and 140, as well as images corresponding to each lane of the print output 150 (e.g., one or more copies of the ribbon image for each lane, where each ribbon image comprises repeating copies of one of the images of the original image data 130 or 140). The image correction module 126 may also store calibrations for individual ribbon images that will minimize visual variations in the print output 150 generated from those ribbon images.

In one example, the image correction module 1126 may further comprise an ICF05 library that compresses the contone rasterized image data 132 into a plurality of tiles to facilitate application of calibrations. However, ICF05 is only one type of file format that may be used in the compression domain. Depending on whether visual variations in the print output 150 have been detected, either the rasterized image data 132 or the modified rasterized image data 134 is passed to the print engine controller 114. That is, if there are visual variations in the print output 150, then the rasterized image data 132 may be passed to the print engine controller 114 instead of the modified rasterized image data 134.

Either or both of the color conversion module 124 and the image correction module 126 may be implemented as a distinct programming element or as part of an integrated program or programming element to perform specified functions. Furthermore, either or both of the color conversion module 124 and the image correction module 126 may include a processor and/or other electronic circuitry and components to execute the programming (i.e., executable instructions) to perform the specified functions. In some examples, modules, such as modules 124 and 126 of FIG. 1, may comprise a combination of hardware and programming to implement the functionalities of the modules.

The print engine controller 114 includes a halftoning module 128 and a colors-to-printing-fluid conversion module 110. In another example, the halftoning module 128 may reside on the RIP 122. The halftoning module 128 receives either the contone rasterized image data 132 or the modified rasterized image data 134 and converts it to halftone data 136. Conversion to halftone data 136 includes approximating continuous tone colors with a limited number of available discrete colors. For instance, the colors that the system 100 cannot print directly may be simulated using patterns of pixels in the colors that are available. The halftoning module 128 may perform any one or more halftoning techniques to perform this conversion.

The colors-to-printing-fluid conversion module 110 receives the halftone data 136 and maps the halftone data 136 to drops of printing fluid to be generated by the printheads 120. This information may be used to drive the printheads 120 to produce a printed image.

Either or both of the halftoning module 128 and the colors-to-printing-fluid conversion module 110 may be implemented as a distinct programming element or as part of an integrated program or programming element to perform specified functions. Furthermore, either or both of the halftoning module 128 and the colors-to-printing-fluid conversion module 110 may include a processor and/or other electronic circuitry and components to execute the programming (i.e., executable instructions) to perform the specified functions.

Moreover, although the print engine controller 114 is illustrated as an internal component of the system 100, some printer controller functions may be performed outside of the system 100. Thus, the system illustrated in FIG. 1 shows only one example configuration that may be used to implement the functionality of the color conversion module 124, the image correction module 126, and the halftoning module 128.

In one example, the print engine 116 is implemented as a modular print bar that includes a plurality of printhead modules 118, each of which is controlled by a respective print module controller 138. Each printhead module, in turn, includes a plurality of printheads 120. The printheads 120 may be of the type used in high-speed commercial packaging web presses. For instance, the printheads 120 may each include a plurality of pens. The printheads 120 are driven by the halftone data 136 produced by the halftoning module 128, for instance at one or two bits of data per pixel in each color plane. In this example, the print engine controller 114 passes instructions to the print engine 116 via a print bar interface 140.

The vision system 142 monitors the multi-lane print output 150. To this end, the vision system 142 may include an image capturing device and a communication device for sending a signal 144 to the image correction module 126. The vision system 142 may thus be communicatively coupled directly to the image correction module 126. The signal 144 includes an image of the real time multi-lane print output 150 (i.e., the print output currently being generated by the system 100, allowing for some latency in data transmission). The image correction module 126 may use this image to identify visual variations in the print output 150, as well as variations between the original image data 130 and 140 and the print output 150, as discussed above. The image correction module 126 may also use this image to compute and apply a calibration to the contone rasterized image data 132 for a ribbon image in order to minimize the detected visual variations and improve the consistency of the multi-lane print output 150.

Figure 2:
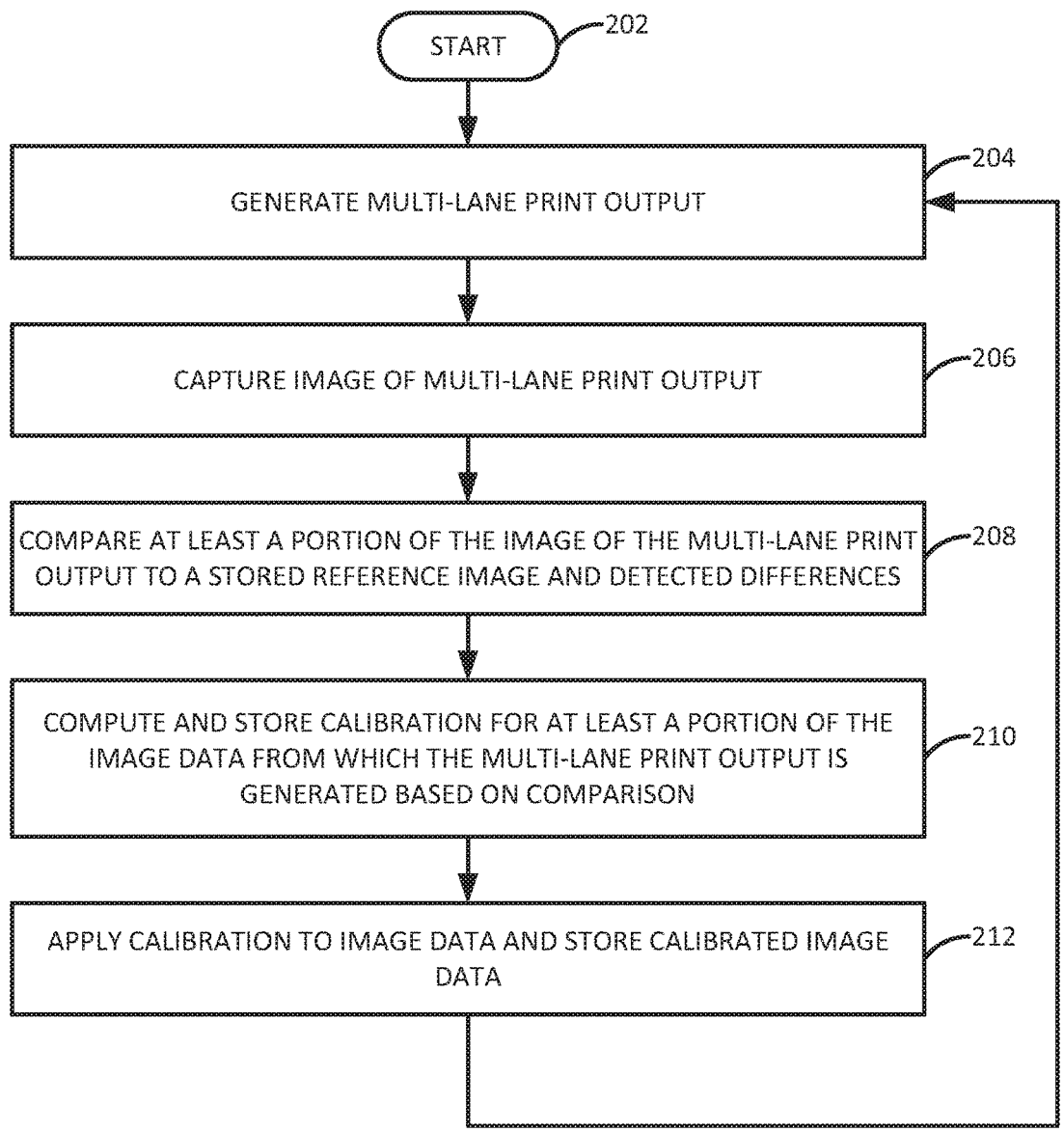
FIG. 2 illustrates a flowchart of an example method for correcting visual variations in multi-lane print outputs.

FIG. 2 illustrates a flowchart of an example method 200 for correcting visual variations in multi-lane print outputs. The method 200 may be performed, for example, by the system 100 illustrated in FIG. 1. As such, reference is made in the discussion of FIG. 2 to various components of the system 100 to facilitate understanding. However, the method 200 is not limited to implementation with the system illustrated in FIG. 1.

Figure 3:
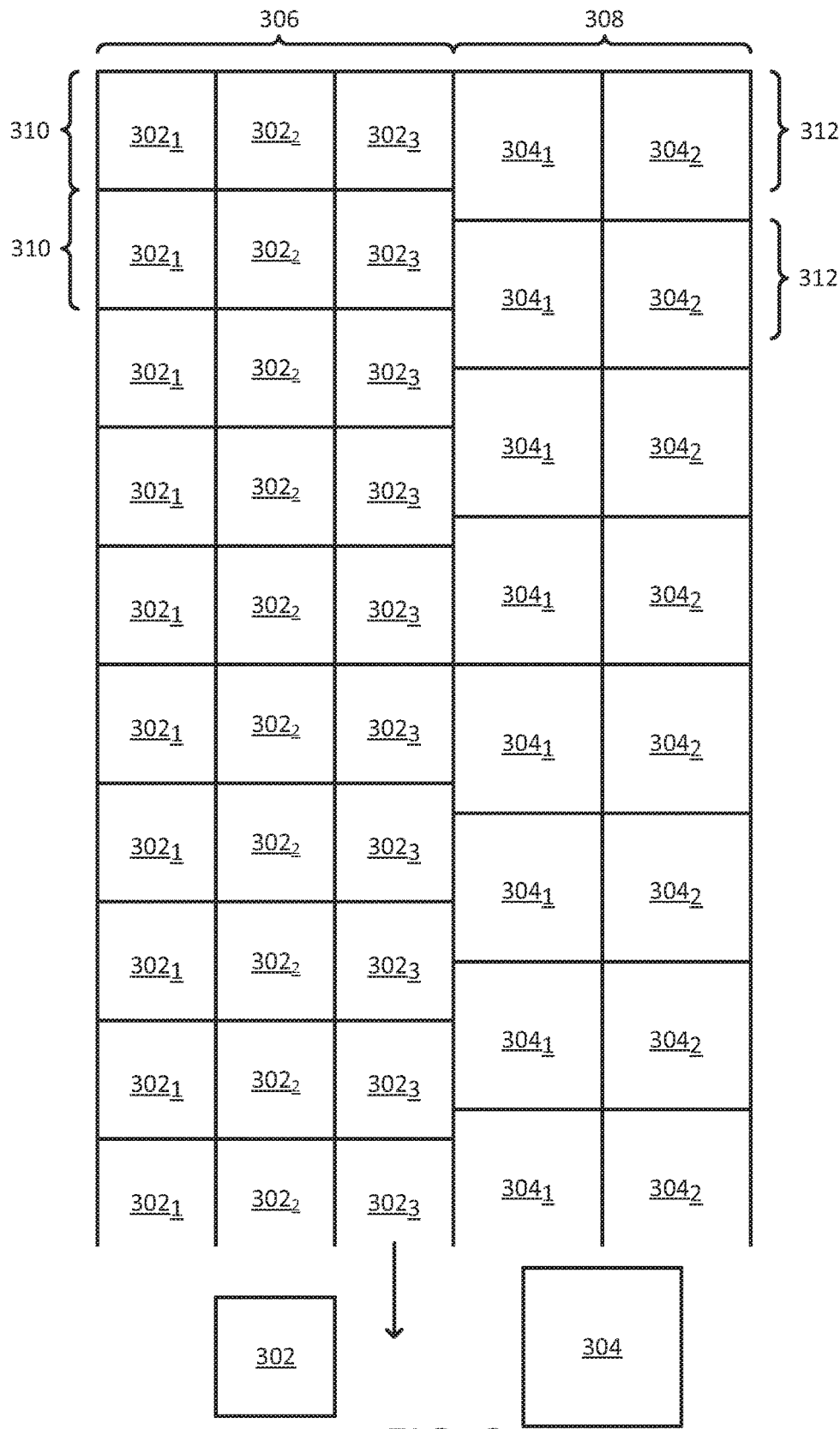
FIG. 3 illustrates a portion of an example web on which two repeating images are printed.

The method 200 begins in block 202. In block 204, the print engine 116 generates a multi-lane print output 150. The multi-lane print output 150 comprises at least two repeating images printed on a web. FIG. 3, for instance, illustrates a portion of an example web 300 on which two repeating images 302 and 304 are printed. The images 302 and 304 may be considered reference or master images. The web 300 is divided into two lanes 306 and 308 that run the down-web length l of the web 300, and each lane 306 and 308 carries a different one of the two images 302 and 304, respectively. Due to differences in the sizes of the images 302 and 304, the lanes 306 and 308 may not be of the same size/width (for instance, in the example of FIG. 3, the lane 306 is wider than the lane 308). Each lane 306 and 308 further includes multiple ribbons 310 and 312, respectively, which run the cross-web widths of the lanes 306 and 308 and repeat down the length of the lanes. Due to differences in the sizes of the images 302 and 304, the ribbons 310 and 312 of the different lanes 306 and 308 may not be of the same size/length (for instance, in the example of FIG. 3, the ribbons 310 are shorter than the ribbons 312).

The image 302 or 304 corresponding to a given lane 306 or 308 may be repeated across the corresponding ribbons 310 and 312. For instance, FIG. 3 shows that the example ribbon 310 includes three copies $302_1$-$302_3$ of the image 302, while example ribbon 312 includes two copies $304_1$-$304_2$ of the image 304. Thus, each ribbon 310 or 312 may be generated from a ribbon image in memory that repeats the image 302 or 304, respectively, in the cross-web direction. One or more printings of the ribbon image in the down-web direction creates a lane 306 or 308. In one example, each ribbon 302 or 304 in a respective lane 306 or 308 is generated from a unique ribbon image. At system startup (i.e., before any calibration takes place), all of the unique ribbon images will be identical.

Referring back to FIG. 2, in block 206, the vision system 142 captures an image of the multi-lane print output of the system 100. In one example, capturing the image also includes converting the image into a file format that can be compared to a stored reference image (e.g., to images 302 and 304 of FIG. 3).

In block 208, the image correction module 126 compares at least a portion of the image of the multi-lane print output to the stored reference image and detects any differences. For instance, if the image of the multi-lane print output depicted a ribbon 310 of the lane 306 of FIG. 3, then the image correction module 126 might compare each unique copy $302_1$-$302_3$ of the lane image appearing in the ribbon 310 to the reference image 302. If any of the copies $302_1$-$302_3$ differ from the reference image 302, the differences are recorded by the image correction module 126. It is possible that each copy $302_1$-$302_3$ could vary in a different manner from the reference image 302.

In block 210, the image correction module 126 computes and stores a calibration for at least a portion of the image data (e.g., compressed image files or uncompressed rasterized image data) from which the ribbons of the print output are printed. It is possible that the calibration for the image data corresponding to each ribbon image could be unique, since each of the corresponding printed ribbons may differ in its variation from the reference image 302. Thus, a first calibration may be computed for the image data corresponding to a first ribbon image, a second calibration may be computed for the image data corresponding to a second ribbon image, and so forth.

In one example, a calibration is computed by calculating some average metric across the copies of an image in a ribbon. For example, the average color of the copies $302_1$-$302_3$ of the image 302 in the ribbon 310 may be calculated. The corresponding ribbon image may then be corrected so that all of the copies $302_1$-$302_3$ of the image are calibrated to the average. Alternatively, the inverse transform for each copy $302_1$-$302_3$ of the image 302 may be calculated using the average, and the corresponding ribbon image may be corrected so that each copy $302_1$-$302_3$ of the image 302 is calibrated to its respective inverse transform.

In block 212, the image correction module 126 applies the calibration(s) computed in block 210 to the image data for the ribbon image. In one example, applying the computed calibrations involves modifying the stored image data corresponding to the ribbon image. For instance, in one example, the compressed image file corresponding to the ribbon image may be modified according to the calibration. If the compressed image file is an ICF05 file, for example, applying the calibration may involve changing an ICF cell in the ICF05 file to an adjacent cell one or more times. An "adjacent cell" in this context is a cell having a color that is one saturation level higher or lower than the saturation level of the starting cell. Thus, the calibration in this context comprises the set of adjacency steps taken to make the print output generated from the image data match the reference image. In further examples, however, applying the computed calibrations is performed on an uncompressed image file, such as on the raw rasterized image data (e.g., rasterized image data 132 of FIG. 1). In further examples still, the computed calibrations are applied using look-up tables (LUTs) in the pens or in International Color Consortium (ICC) calibration of the original image data. In one example, block 212 includes storing the image data for the calibrated ribbon image as the new default image data. The previous, pre-calibration image data may be saved or discarded depending on resource constraints.

The method 200 then returns to block 204, where the print engine 116 generates the print output 150, this time using the calibrated image data produced in block 212. In one example, the calibrated image data is not used to generate the print output until printing of the next lane commences. Thus, the portions of the print output 150 that are printed going forward will incorporate the calibrations intended to minimize any visual variations from the reference image. The vision system 142 continues to monitor the print output as described above, and calibrations may be made to the stored image data as necessary until the print job is complete. Outdated calibrations may be saved or discarded as new calibrations are generated, depending on resource constraints.

In further examples, calibrations may be created specifically for testing the system 100 (e.g., for testing the consistency of pen output or the texture of the web). For instance, calibrations could be created that result in the printed output displaying a particular test pattern (e.g., including stripes, dimples, zigzags, or the like). These calibrations may be adjusted in two dimensions (e.g., cross-web and down-web), so that any pattern can be created. Each ribbon of the printed output may be associated with its own calibration, so that multiple test patterns can be run in parallel.

Moreover, since each lane of the print output is processed relatively independently (e.g., all lanes share a common image capture event by the vision system 142 but are printed from independent image data and per-ribbon calibrations), each lane may be associated with its own calibration intent. For instance, one lane may be calibrated to exhibit consistent color among its ribbons, but another lane may be calibrated to exhibit absolute color (e.g., green or red).

Although the method 200 uses the vision system to help detect visual variations in the print output of the system, these variations could be detected by other means as well. For instance, an automated image analysis could show that one or more of the images to be printed has a saturated flat section that is expected to be problematic when printed (e.g., due to thermal effects of the pens when printing in solid areas). In this case, the ribbon images could be calibrated accordingly prior to printing in an attempt to preempt this issue. In further examples, the ribbon images may be pre-calibrated (i.e., prior to printing) to account for the known thermal signature across the print bar. For instance, the ribbon images could be pre-calibrated to distort the image data for the edges of the ribbons relative to the centers of the ribbons.

In further examples, the techniques of the present disclosure can be applied in the realm of three-dimensional (3D) printing to improve part-to-part consistency. The control systems of a 3D printer, including the printing nozzles and positioning parameters, may exhibit unintentional variation in the same way that the control systems of a PWPW might.

It should be noted that although not explicitly specified, some of the blocks, functions, or operations of the method 200 described above may include storing, displaying and/or outputting for a particular application. In other words, any data, records, fields, and/or intermediate results discussed in the methods can be stored, displayed, and/or outputted to another device depending on the particular application. Furthermore, blocks, functions, or operations in FIG. 2 that recite a determining operation, or involve a decision, do not necessarily imply that both branches of the determining operation are practiced. In other words, one of the branches of the determining operation can be deemed to be optional.

Figure 4:
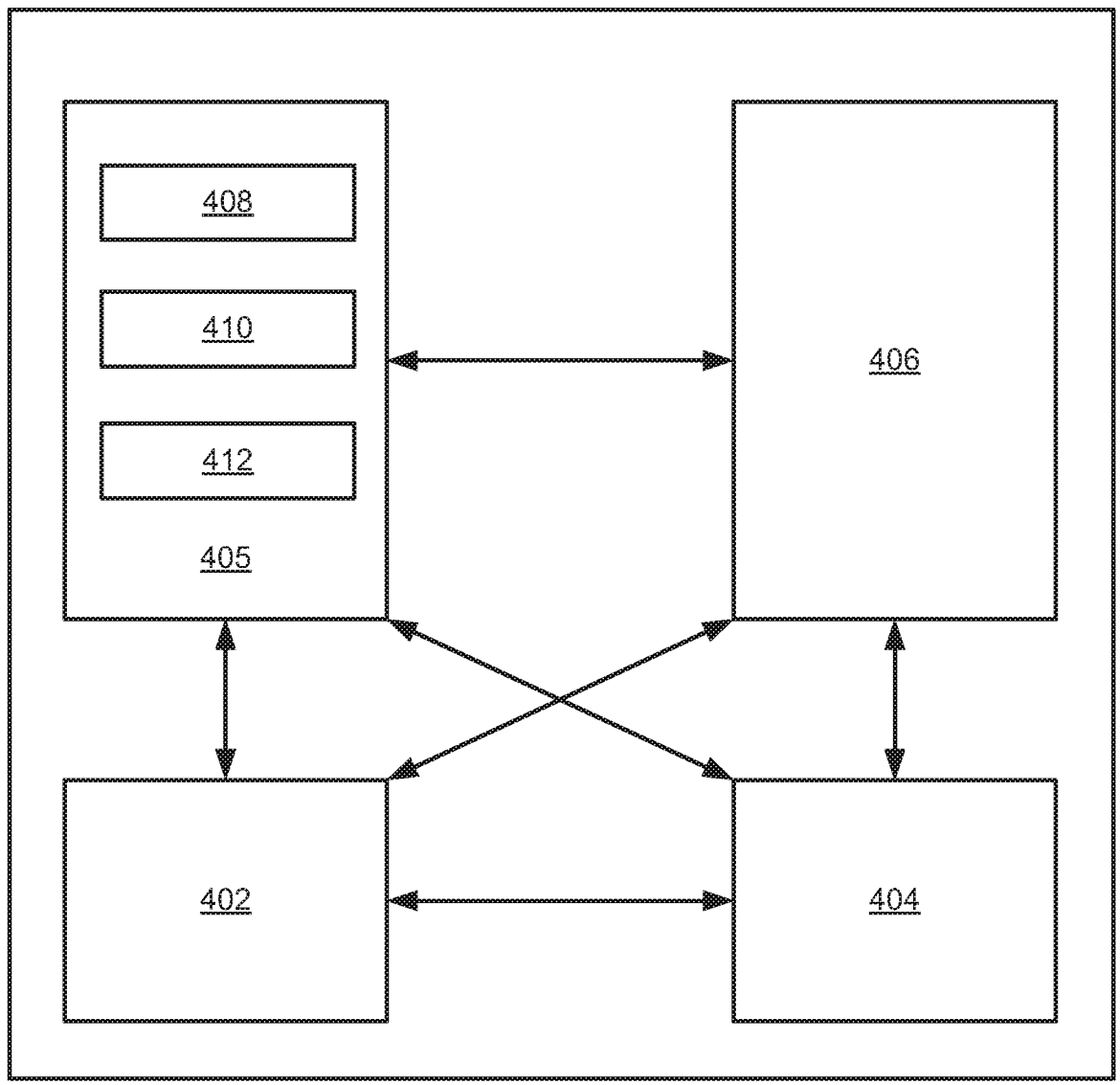
FIG. 4 depicts a high-level block diagram of an example computer that can be transformed into a machine capable of performing the functions described herein.

FIG. 4 depicts a high-level block diagram of an example computer that can be transformed into a machine capable of performing the functions described herein. Notably, no computer or machine currently exists that performs the functions as described herein. As a result, the examples of the present disclosure modify the operation and functioning of the general-purpose computer to correct visual variations in multi-lane print outputs, as disclosed herein.

As depicted in FIG. 4, the computer 400 comprises a hardware processor element 402, e.g., a central processing unit (CPU), a microprocessor, or a multi-core processor, a memory 404, e.g., random access memory (RAM) and/or read only memory (ROM), a module 405 for correcting visual variations in multi-lane print outputs, and various input/output devices 406, e.g., storage devices, including but not limited to, a tape drive, a floppy drive, a hard disk drive or a compact disk drive, a receiver, a transmitter, a speaker, a display, a speech synthesizer, an output port, an input port and a user input device, such as a keyboard, a keypad, a mouse, a microphone, and the like. Although one processor element is shown, it should be noted that the general-purpose computer may employ a plurality of processor elements. Furthermore, although one general-purpose computer is shown in the figure, if the method(s) as discussed above is implemented in a distributed or parallel manner for a particular illustrative example, i.e., the blocks of the above method(s) or the entire method(s) are implemented across multiple or parallel general-purpose computers, then the general-purpose computer of this figure is intended to represent each of those multiple general-purpose computers. Furthermore, a hardware processor can be utilized in supporting a virtualized or shared computing environment. The virtualized computing environment may support a virtual machine representing computers, servers, or other computing devices. In such virtualized virtual machines, hardware components such as hardware processors and computer-readable storage devices may be virtualized or logically represented.

It should be noted that the present disclosure can be implemented by machine readable instructions and/or in a combination of machine readable instructions and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the blocks, functions and/or operations of the above disclosed methods.

In one example, instructions and data for the present module or process 405 for correcting visual variations in multi-lane print outputs, e.g., machine readable instructions can be loaded into memory 404 and executed by hardware processor element 402 to implement the blocks, functions or operations as discussed above in connection with the method 200. For instance, the module 405 may include a plurality of programming code components, including a comparator component 408, a calibration calculation component 410, and a calibration application component 412. These programming code components may be included, for example, in an image correction component, such as the image correction module 126 of FIG. 1.

The comparator component 408 may be configured to identify areas in a multi-lane print output that vary from a reference image. For instance, the comparator component 408 may be configured to perform all or part of block 208 of the method 200 described above.

The calibration calculation component 410 may be configured to calculate a calibration to image data that will make the print output appear more like the reference image. For instance, the calibration calculation component 410 may be configured to perform block 210 of the method 200 described above.

The calibration application component 412 may be configured to apply a calibration to the image data for a stored ribbon image. For instance, the calibration application component 412 may be configured to perform block 212 of the method 200 described above.

Furthermore, when a hardware processor executes instructions to perform "operations", this could include the hardware processor performing the operations directly and/or facilitating, directing, or cooperating with another hardware device or component, e.g., a co-processor and the like, to perform the operations.

The processor executing the machine readable instructions relating to the above described method(s) can be perceived as a programmed processor or a specialized processor. As such, the present module 405 for correcting visual variations in multi-lane print outputs, including associated data structures, of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, or variations therein may be subsequently made which are also intended to be encompassed by the following claims.

What is claimed is:

1. An apparatus, comprising:
   a vision system for capturing an image of a multi-lane print output printed on a web; and
   an image correction module for
      detecting a visual variation in a lane of a print output, wherein the lane comprises a plurality of ribbons, and wherein each ribbon of the plurality of ribbons comprises a plurality of copies of an image that repeat in a cross-web direction,
      for calculating a calibration for a first ribbon of the plurality of ribbons that makes the visual variation less visible; and
      for adjusting unique image data from which the first ribbon is printed according to the calibration without adjusting unique image data from which a second ribbon of the plurality of ribbons is printed.

2. The apparatus of claim 1, wherein the printing device is a packaging web press.

3. The apparatus of claim 1, further comprising:
   a print engine for printing the multi-lane print output on a web using the adjusted unique image data for the first ribbon.

4. The apparatus of claim 1, wherein the vision system is communicatively coupled directly to the image correction module.

5. A non-transitory machine-readable storage medium encoded with instructions executable by a processor, the machine-readable storage medium comprising:
   instructions to detect a visual variation in a lane of a print output printed on a web, wherein the lane comprises a plurality of ribbons, and wherein each ribbon of the plurality of ribbons comprises a plurality of copies of an image that repeat in a cross-web direction;
   instructions to calculate a calibration for a first ribbon of the plurality of ribbons that makes the visual variation less visible; and
   instructions to adjust unique image data from which the first ribbon is printed according to the calibration without adjusting unique image data from which a second ribbon of the plurality of ribbons is printed.

6. The non-transitory machine-readable storage medium of claim 5, wherein the visual variation is relative to a reference image.

7. The non-transitory machine-readable storage medium of claim 5, wherein the unique image data from which the first ribbon is printed comprises a compressed image file.

8. The non-transitory machine-readable storage medium of claim 7, wherein the instructions to adjust the unique image data from which the first ribbon is printed comprise:

instructions to change a cell in the compressed image file to an adjacent cell having a saturation level that is one saturation level different from a current saturation level of the cell.

9. The non-transitory machine-readable storage medium of claim 5, wherein the unique image data from which the first ribbon is printed comprises uncompressed rasterized image data.

10. The non-transitory machine-readable storage medium of claim 9, wherein the instructions to calculate the calibration comprise:
instructions to calculate an average of a metric across the plurality of copies of the image repeating across the first ribbon.

11. The non-transitory machine-readable storage medium of claim 10, wherein the instructions to adjust the unique image data from which the first ribbon is printed comprise:
instructions to calibrate portions of the unique image data corresponding to each copy of the plurality of copies of the image to the average.

12. The non-transitory machine-readable storage medium of claim 10, wherein the instructions to adjust the unique image data from which the first ribbon is printed comprise:
instructions to calibrate portions of the unique image data corresponding to each copy of the plurality of copies of the image to an inverse transform computed from the average.

13. A method, comprising:
detecting a visual variation in a lane of a print output printed on a web, wherein the lane comprises a plurality of ribbons, and wherein each ribbon of the plurality of ribbons comprises a plurality of copies of an image that repeat in a cross-web direction;
calculating a calibration for a first ribbon of the plurality of ribbons that makes the visual variation less visible; and
adjusting unique image data from which the first ribbon is printed by according to the calibration without adjusting unique image data from which a second ribbon of the plurality of ribbons is printed.

14. The method of claim 13, wherein a calibration intent for the lane of the print output differs from a calibration intent for another lane of the same print output.

* * * * *